July 14, 1953  J. FISHER  2,645,218
APPARATUS FOR CASTING ARTICLES
Filed Feb. 9, 1950  3 Sheets-Sheet 2
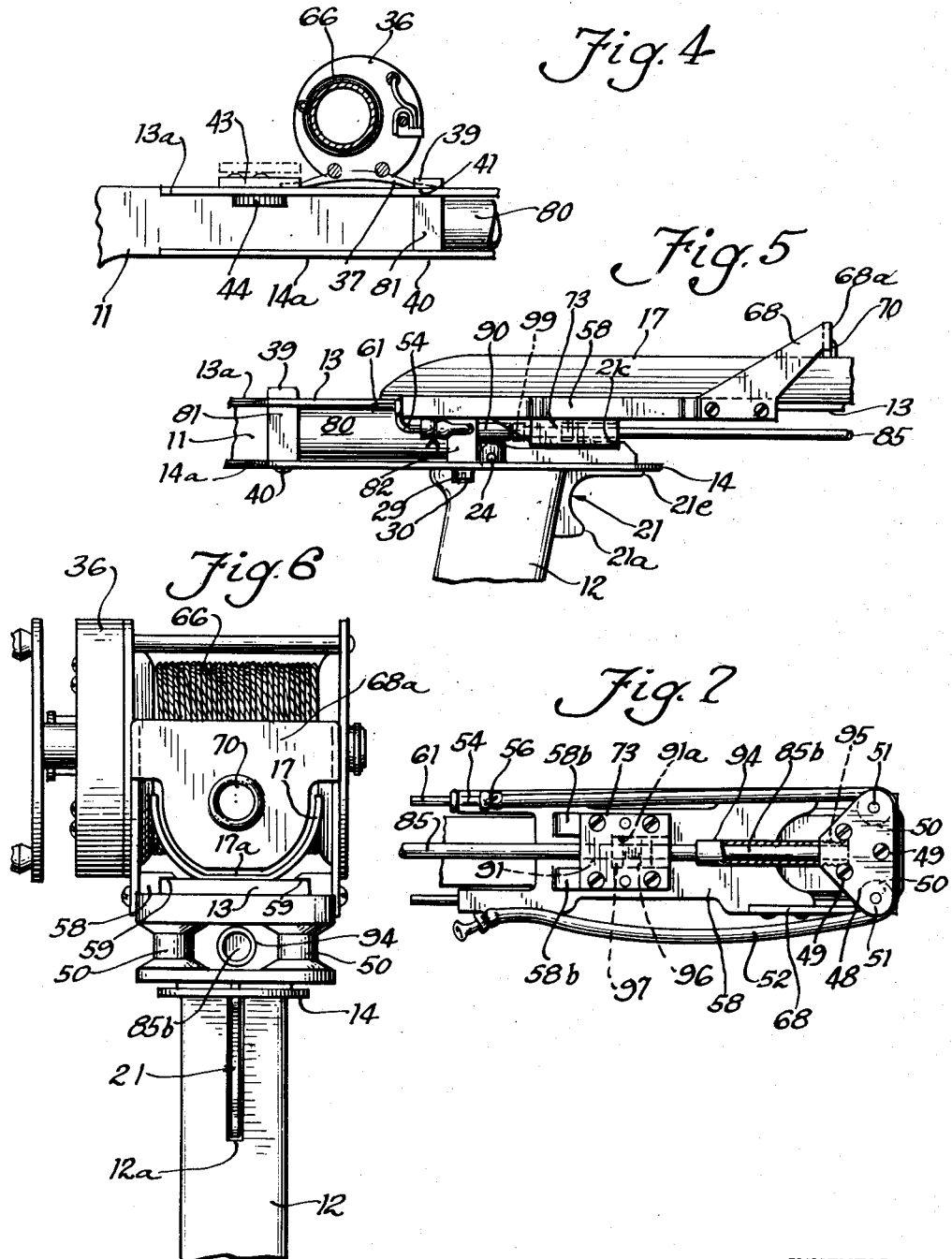
INVENTOR.
Jesse Fisher
BY
Mason, Kolehmainen, Rathburn & Wyss
Att'ys July 14, 1953  J. FISHER  2,645,218
APPARATUS FOR CASTING ARTICLES
Filed Feb. 9, 1950  3 Sheets-Sheet 3
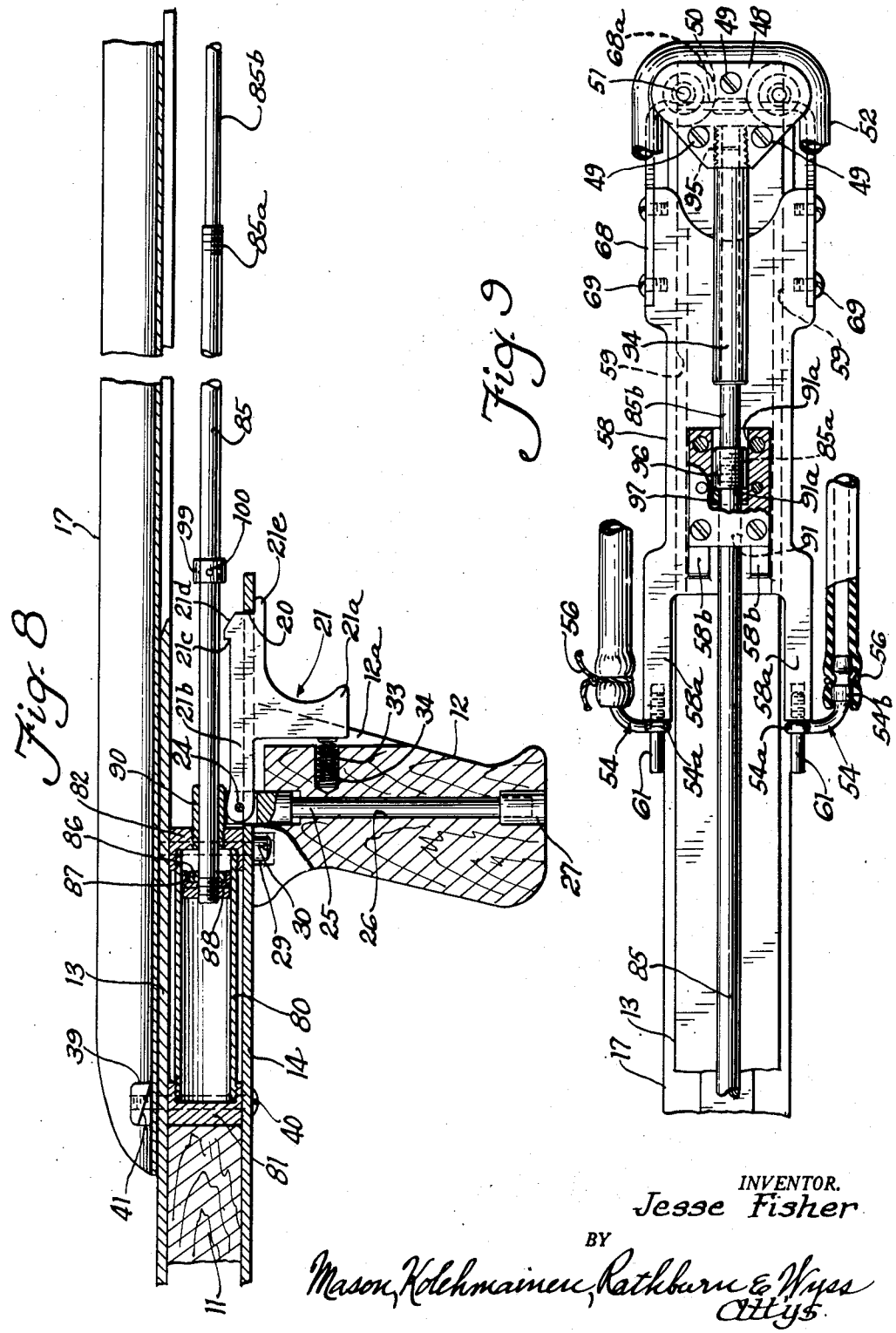
INVENTOR.
Jesse Fisher
BY
Mason, Kolehmainen, Rathburn & Wyss
Attys.

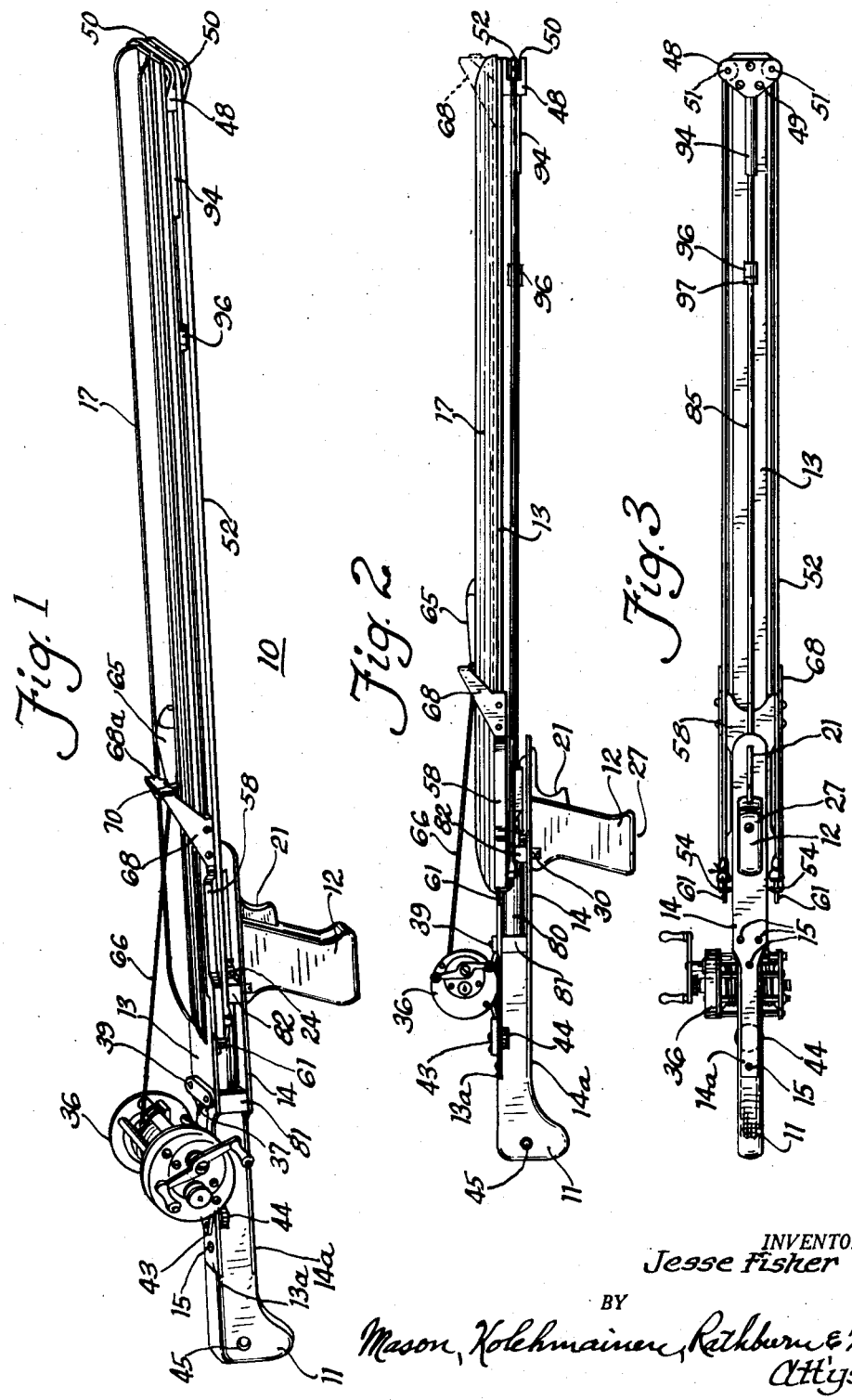

Patented July 14, 1953

2,645,218

UNITED STATES PATENT OFFICE 2,645,218

APPARATUS FOR CASTING ARTICLES

Jesse Fisher, Medford, Wis., assignor to Glo-Lure, Inc., Medford, Wis., a corporation of Wisconsin Application February 9, 1950, Serial No. 143,187

6 Claims. (Cl. 124—21)

The present invention relates to apparatus for casting articles such as bait and more particularly to means whereby bait attached to one end of a fishing line may be hurled a satisfactory distance from the operator into a body of water.

It is well known that conventional fishing equipment where the bait is to be cast into the water comprises the usual rod, reel and line, one end of the line being attached to the reel while the other end is provided with a suitable hook attached to the appropriate bait. To obtain the maximum enjoyment from such sport, it is necessary to be able to cast the bait a considerable distance out into the body of the water such as a lake or a stream to provide a long lineal path for reeling in the bait toward the operator. Unfortunately, many people are not sufficiently skilled in the casting operation to enable them fully to enjoy the sport of fishing and consequently, they soon become discouraged and abandon this healthful and enjoyable recreation.

The casting operation generally employed by fishermen requires considerable overhead or side space in order to move the arm and rod in a manner to throw the bait into the water. In view of this, it is physically impossible for the fisherman with the conventional equipment to make a good cast in a dense woods or in heavy foliage commonly found along certain lakes and streams. Under such conditions even the most expert caster finds it impossible to use his equipment. Also, in a crowded boat or canoe casting is difficult and in fact, is actually dangerous for any except the most expert casters. It would be desirable to provide a device or apparatus for casting bait into a lake or stream in locations where it is impossible to use conventional casting equipment and furthermore which apparatus is well adapted for use anywhere, even by a novice.

Accordingly, it is an object of the present invention to provide an improved apparatus or device for casting articles which may be used by a novice as well as those adept in the art of such casting.

It is another object of the present invention to provide an improved device for casting bait into a lake or stream which is capable of shooting or placing the bait exactly where it is desired.

Still another object of the present invention is to provide a bait casting device whereby anyone may cast like an expert from the very first attempt.

It is a further object of the present invention to provide a bait casting device in which the distance the bait is thrown may be changed in a simple and expeditious manner.

It is another object of the present invention to provide an improved bait casting device of simple and sturdy construction which may give many years of fool-proof service and which may be manufactured and assembled at low cost.

Further objects and advantages of the present invention will become apparent as the following description proceeds and the features of novelty which characterize the invention will be pointed out with particularity in the claims annexed to and forming a part of this specification.

The present invention is primarily concerned with a device for casting bait constructed somewhat in the form of a gun with a pistol grip and associated trigger and a trough shaped device for guiding the bait in its movement during the initial portion of the casting operation. A movable carriage is provided which is moved along the trough by the force produced upon release of energy stored in a suitable energy storage device. The energy storage device comprises rubber tubing which is stretched and latched in the stretched condition by means releasable upon actuation of the trigger. An improved buffing or stopping means for quickly dissipating the energy released upon manipulation of the casting device is provided. Several different sizes of rubber tubing may selectively be employed and quickly interchanged to give different casting distances as desired.

For a better understanding of the present invention, reference may be had to the accompanying drawings in which:

Fig. 1 is a perspective view of the apparatus of the present invention shown with the energy storage device in the charged condition so that the bait may be cast merely upon release of the trigger;

Fig. 2 is a side elevational view similar to Fig. 1 with the movable carriage shown by solid lines in the charged condition and by dotted lines in the position assumed when in the uncharged condition;

Fig. 3 is a bottom view of Fig. 2;

Fig. 4 is an enlarged view partly in section of the reel-seat and associated apparatus of the present invention;

Fig. 5 is an enlarged partial view of the trigger mechanism and associated apparatus in the positions shown in Fig. 2 of the drawings;

Fig. 6 is an enlarged front end view of the apparatus in the position shown in Fig. 2 of the drawings;

Fig. 7 is a partial view partly in section of the bottom front of the apparatus in the uncharged condition showing how the energy storage device may be applied thereto;

Fig. 8 is an enlarged sectional view of the portion of the mechanism shown in Fig. 5 of the drawings; and Fig. 9 is an enlarged view partly in section similar to Fig. 7 of the drawings.

Referring now to the drawings, there is illustrated an apparatus for casting articles generally designated at 10 which comprises a mechanism having some general resemblance to a gun with a grip stock 11 and a pistol grip 12 which are assembled as a unitary structure by upper and lower supporting members 13 and 14 respectively. The upper supporting member 13 effectively comprises a slide bar of elongated configuration somewhat of the order of three feet in length and which may be formed of aluminum or other suitable material. The rear ends 13a and 14a of the slide bar 13 and lower mounting plate 14 respectively are of reduced width so as to conform to the dimensions of the grip stock 11. The members 13 and 14 are held in spaced parallel relationship by having their rear ends 13a and 14a fastened to the grip stock 11 by suitable fastening means such as 15. The grip stock 11 and pistol grip 12 may be formed of a suitable wood, or if desired, molded from a suitable plastic and finished to look like wood. To the forward end of the slide bar 13 there is attached as by riveting, spot welding or the like, a suitable trough or guide member 17 which has a somewhat semi-circular configuration as is best shown in Figs. 1 and 6 of the drawings. As illustrated, the trough 17 has a flattened bottom indicated at 17a in Fig. 6 of the drawings to provide a satisfactory surface for the sliding movement of the article to be cast and also to facilitate fastening to the slide bar 13. Preferably the trough 17 and slide bar 13 are manufactured as a sub-assembly.

The lower mounting support 14 is a relatively short member which extends forwardly from the grip stock 11 only slightly beyond the pistol grip 12. This lower mounting plate 14, as is best shown in Fig. 8 of the drawings, includes an elongated slot 20 for receiving therein a pivotally mounted trigger 21 partially disposed within a narrow recess 12a defined in the pistol grip 12. As illustrated, the trigger 21 is of somewhat T-shaped configuration comprising a manual actuating extension 21a partially disposed within the recess 12a defined in the pistol grip 12. One arm 21b of the T-shaped trigger 21 is pivotally mounted as by the pivot pin 24 between the bifurcations at one end of a pistol grip tie rod 25, which is adapted to be disposed within a passageway 26 extending completely through the pistol grip 12.

For the purpose of fastening the pistol grip 12 to the lower mounting plate 14, the enlarged upper end of the tie rod 25 is extended through a suitable opening in the mounting plate 14 which is an enlargement at one end of the slot 20, and the pin 24 is inserted pivotally to connect the trigger 21 in position. The pin 24 has its ends extending beyond the circumference of the tie rod 26 as is best shown in Fig. 1 so as to engage the upper surface of the lower mounting plate 14. By applying a suitable nut 27 to the lower end of the tie rod 25, the pistol grip 12 is firmly clamped to the bottom side of the lower mounting plate 14 with the trigger 21 disposed within the elongated slot 20. The pistol grip 12 is furthermore provided with recess 29 on either side thereof for accommodating suitable clamping screws 30 to be described hereinafter, thus preventing any twisting movement of the pistol grip relative to the lower mounting plate 14.

The trigger 21, in addition to the arms 21a and 21b, includes a third arm having means thereon defining a latch shoulder 21c adjacent an inclined surface 21d, the purpose of which will become apparent from the following description. In order to maintain the trigger 21 in a latching position a suitable compression spring 33 is provided, disposed within a recess 34 defined within the pistol grip 12, with one end of the compression spring 33 engaging the manually actuable extension 21a thereby to bias the pivotally mounted trigger 21 so as to tend to rotate in a counterclockwise direction as viewed in Fig. 8 of the drawings. To limit the extent of pivotal movement of the trigger 21 in a counterclockwise direction, the latter is provided with an extension 21e engageable with the lower mounting plate 14 as is clearly shown in Fig. 8 of the drawings.

The casting device when used for casting bait into a stream or lake requires means associated therewith for supporting a conventional fishing reel such as is designated at 36 in the drawings. Such a reel, which forms no part of the present invention, is conventionally provided with a reel attaching plate 37 and the casting device of the present invention is provided with means for permitting ready attachment and release of the conventional reel attaching plate 37. As illustrated, a reel strap 39 is fastened to the upper surface of the slide bar 13 as by suitable fastening means or screws 40. This reel strap is provided with a recess 41 to receive one end of the reel attaching plate 37. A reel clamp plate 43 is suitably disposed on the end 13a of the top mounting plate 13 and is related in clamping relationship therewith by a suitable thumb actuated clamp nut 44 disposed in a recess defined in the grip stock beneath the end 13a of the slide bar 13. The clamp plate 43 is provided with an undercut recess to engage the other end of the reel supporting strap 37 as is best shown in Fig. 4 of the drawings. Preferably, also the grip stock 11 is provided with a suitable opening 45 to receive a sling for supporting the end of the grip stock from the fisherman's shoulder or the like.

To releasably support an energy storage device, the energy of which is released upon actuation of the trigger 21, there is suitably attached to the front of the slide bar 13 a support bracket 48 as by suitable fastening means 49. This support bracket 48 is recessed at the front end thereof to receive suitable power strand reels 50 rotatably supported as indicated at 51. In accordance with the present invention, the power strand reels 50 which are provided with edge flanges are adapted to support a power strand or energy storage device 52 preferably formed of surgical rubber tubing or the like and when in operative relation, disposed in a U-shaped configuration with the bight of the U engaging the power strand rollers 50 and the ends of the U extending toward the rear of the casting device. It should be understood that the energy storage device might also comprise tension or compression springs or other elements in which energy may be stored for immediate release. This power strand 52 is highly stretched when the apparatus is in the charged condition shown in Figs. 1, 2, 3 and 5 of the drawings, and relatively loose when in the uncharged condition shown in Figs. 7 and 9 of the drawings. The ends of the power strand 52 are suitably attached to strand hooks 54 which include a pin receiving portion 54a at one end and a sort of a dumbbell-shaped portion 54b at the other end adapted to be received within the ends of the rubber tubing or power strand 52. In order to fasten the strand hooks 54 to the ends of the power strand 52, suitable fastening means in the form of a waxed linen thread or cord 56 is tied around the ends of the tubing between the enlargements of the dumbbell shaped ends 54b. This firmly attaches the hooks 54 with the ends of the power strand 52.

In order to utilize the energy which may be stored in the power strand 52 when the ends thereof are stretched, there is provided a slide 58 having undercuts 59 along each side to define a slide recess for receiving therein the slide bar 13 as is clearly shown in Figs. 6 and 9 of the drawings. This slide 58, during the assembly operation, may be slipped over the forward end of the slide bar 13 prior to the attachment thereto of the support bracket 48. The slide 58 is furthermore provided with rearward extensions 58a disposed on either side of the slide bar 13 for supporting therein suitable strand hook studs 61 which may be threadedly mounted to the slide 58 as indicated in Fig. 9 of the drawings. The strand hooks 54 fastened to the power strand 52 may then be slipped over the studs 61 so as to associate the slide 58 with the power strand 52. It will be apparent that energy may be stored in the power strand 52 by moving the slide 58 along the slide bar 13 from the position shown in Figs. 7 and 9 to the positions shown in Figs. 1 and 2 with the consequent stretching of the rubber tubing 52. Upon release of the energy stored in the strand 52, the slide 58 will be caused to move with high speed toward the support bracket 48.

For the purpose of having movement of the slide 58 also cause movement of a suitable article such as the bait 65 disposed in the trough 17 shown in Figs. 1 and 2 of the drawings, and connected to a suitable fishing line 66 adapted to be wound on the reel 36, there is provided a push plate 68 of somewhat U-shaped configuration extending over the trough 17 with the legs of the U fastened by suitable fastening means 69 to the front sides of the slide 58. The bight of the U-shaped push plate 68 is provided with a portion 68a having a configuration conforming to the shape of the trough 17 as is clearly shown in Fig. 6 of the drawings to engage and push the bait 65 or other article disposed in the trough 17 in response to movement of the slide 58. The bight 68a of the push plate 68 is provided with a suitable opening 70 which provides a line guide hole through which the fishing line 66 extends. As will be obvious, one end of the line 66 is attached to the bait 65 disposed in front of the push plate 68, while the other end of the fishing line is attached to the reel 36 disposed to the rear of the push plate 68. The edges of the line guide hole 70 are preferably embossed, swaged and polished so as to prevent any damage to the line which must be pulled through this opening 70 at fairly high speed during a casting operation.

In order that the slide 58 may be latched in a position with energy stored in the power strand 52 for release upon actuation of the trigger 21, there is attached to the bottom of the slide 58 and supported against the lugs 58b, a suitable slide yoke 73 having a hardened forward edge engageable by the latch shoulder 21c of the trigger 21 which shoulder is preferably also hardened to insure long and fool-proof service. It will be apparent that the casting apparatus of the present invention may be made ready for casting upon attachment of the power strand 52 to the slide 58 and the support bracket 48, merely by manually moving the slide 58 toward the trigger 21, thereby storing energy in the strand 52. When the yoke 73 engages the inclined surface 21d of the trigger 21, the latter will be pivoted in a clockwise direction as viewed in Fig. 8 to permit the yoke 73 to move past the shoulder 21c which when engaged with the front end of the yoke 73, will maintain the power strand 52 charged and hold the slide 58 and the push plate 68 in the positions shown in Figs. 1 and 2 of the drawings.

With the arrangement described thus far, upon release of the trigger 21, the slide 58 and push plate 68 will move at a very high speed to push the bait 65 or article disposed in the trough 17 and project it for a considerable distance beyond the end of the trough 17. Without more, however, the slide 58 will strike the support bracket 48 and damage the device very seriously so as to make it unusable for more than one or two operations, the impact of the slide 58 with the support bracket 48 involving a terrific force. In accordance with the present invention, there is provided suitable cushioning means rendered effective after the desired stored energy in the power strand 52 has been transferred to kinetic energy of the article 65 disposed in the trough 17. To this end, there is provided a buffer mechanism comprising a suitable cylinder 80 having its ends attached to cylinder heads 81 and 82 respectively. These cylinder heads 81 and 82 are suitably disposed between the supporting members 13 and 14 forwardly of the grip stock 11 and generally rearwardly of the piston grip 12. The screws or fastening means 30 described above hold the forward cylinder head 82 in position while the fastening means 40 for the reel strap 39 hold the rear cylinder head in position. Reciprocally mounted relative to the cylinder 80 is piston rod 85 having attached to the rear end disposed within the cylinder 80, a piston comprising a piston head 86, a cup-shaped washer 87 and a cup clamp 88. The cup-shaped washer 87 is preferably formed of oiled tanned leather sealingly engaged with the inside walls of the cylinder 80. The piston rod 85 extends through a suitable opening defined in the forward cylinder head 82 which latter may be provided with a piston rod guide 90. In accordance with the present invention, the piston rod 85 extends through a suitable passageway 91 defined in the yoke 73 and the front end is supported by a piston rod support tube 94 extending rearwardly from the support bracket 48 and preferably threaded into a suitable recess defined therein as indicated at 95. Fastened to the piston rod 85 is a suitable steel buffer member 96. Any suitable means for fastening this buffer member 96 to the rod 85 may be provided. As illustrated, the piston rod 85 is provided with a threaded section 85a to which the buffer 96 may be attached. To accommodate such a threaded section, the piston rod 85 is provided at its forward end with a portion of reduced cross section 85b which terminates at the threaded section 85a. A suitable buffer washer 97 formed of sheet fiber or the like surrounds the piston rod 85 to the rear of the buffer 96. Also, in accordance with the present invention, the yoke 73 has the passageway 91 therethrough counterbored as indicated at 91a to receive therein the buffer 96 and buffer washer 97 as clearly indicated in Fig. 9 of the drawings. With the casting device in the charged condition, release of the trigger 21 as was mentioned above will cause high speed forward movement of the slide 58 and consequently of the yoke 73 relative to the piston rod 85 extending through the passageway 91 in the yoke 73. Upon a predetermined forward movement of the slide 58 and yoke 73, the buffer washer 97 will strike the shoulder of the counterbore 91a as indicated in Fig. 9 of the drawings and cause forward movement of the piston rod 85 and consequently forward movement of the oil tanned leather cup-shaped washer 87 with the consequent cushioning and stopping of the slide 58 in a very short space following engagement of the yoke 73 with the buffer washer 97. It should be understood that although a pneumatic cushioning means has been described, hydraulic, spring or other cushioning means might also be employed.

For the purpose of restoring the piston rod 85 to its initial position for subsequent stopping of the slide 58 following recharging of the energy storage device of the present invention there is provided a return collar 99 which is suitably pinned as indicated at 100 to the piston rod 85. This return collar 99 is so disposed as to be engaged by the rear edge of the yoke 73 during the charging operation of the power strand 52 so as to move the piston rod 85 toward the rear of the cylinder 80 in condition for a subsequent stopping operation of the slide 58. Since the piston rod 85 is disposed beneath the slide bar 13, it may receive considerable wear by being rested on the edges of boats and the like. For long and satisfactory service, this piston rod 85 is preferably formed of stainless steel or other similar material.

In view of the detailed description included above, the operation of the casting device of the present invention will be obvious to those skilled in the art and no further discussion thereof will be included herewith. The power strand formed of surgical tubing may readily be applied and is capable of releasing a very large amount of energy for throwing or casting an article disposed in the trough 17 a considerable distance from the device. Casts of fifty, seventy-five or one hundred feet or more may readily be obtained by the appropriate choice of the power strand 52. With the arrangement described, power strands of different energy storage capabilities may be selectively employed depending upon whether the device is to be used by a child or an adult and also depending upon the length of cast desired. By virtue of the strand rollers 50, the strand hooks 54 and strand pins 61 any size strand may readily be appplied or removed with little or no delay.

While there has been illustrated and described a particular embodiment of the present invention, it will be understood, of course, that the invention is not limited thereto since many modifications may be made and it is therefore contemplated by the appended claims to cover any such modifications as fall within the true spirit and scope of the present invention.

What is claimed as new and desired to be secured by Letters Patent of the United States is:

1. An apparatus for casting articles comprising an elongated support having a trough shaped portion, a slide supported for movement along said support, a push plate connected for movement with said slide and having a portion movable within said trough shaped portion, a power strand arranged in the form of a U having the bight of the U supported by one end of said support and the ends of the legs removably connected to said slide, said power strand being capable of having energy stored therein when said slide is moved away from said one end of said support, releasable means for latching said slide in a predetermined position to restrain movement thereof in response to the energy stored in said strand, a buffer cylinder mounted on said support, an elongated rod mounted beneath said support, a piston slidable in said cylinder connected to one end of said rod, and means for actuating said rod upon a predetermined movement of said push plate following release of said latching means to cushion the movement of said slide and push plate before reaching said one end of said support.

2. An apparatus for casting articles comprising an elongated support having a trough shaped portion, a slide supported for movement along said support, a push plate connected for movement with said slide and having a portion movable within said trough shaped portion, a power strand capable of being stressed in tension arranged in the form of a U having the bight of the U supported by one end of said support and the ends of the legs removably connected to said slide, said power strand being stressed in tension and having energy stored therein when said slide is moved away from said one end of said support, releasable means for latching said slide in a predetermined position to restrain movement thereof against the tensile force of said strand, a buffer cylinder mounted on said support, an elongated rod mounted beneath said support, a piston slidable in said cylinder connected to one end of said rod, means for moving said piston in one direction upon a predetermined movement of said push plate following release of said latching means to cushion the movement of said slide and push plate before reaching said one end of said support, and piston direction reversal means for moving said piston in the reverse direction in response to stressing said power strand.

3. In a device for casting articles comprising an elongated support having a trough shaped portion, a slide mounted for movement along said support including means for moving an article to be cast disposed in said trough shaped portion, a power strand connected to one end of said elongated support and capable of having energy stored therein, means for connecting said strand to said slide thereby to convert the energy stored in said strand to kinetic energy of said slide upon release of said stored energy, a buffer mechanism supported by said elongated support comprising a cylinder disposed at a position remote from said one end, a piston in said cylinder, a piston rod connected to said piston and extending along said support in generally parallel relationship therewith, first and second means fastened to said rod at spaced points therealong, and means on said slide for engaging said first and second means to move said piston in either direction in response to a predetermined movement of said slide.

4. Apparatus for casting articles comprising an elongated support having a trough shaped portion at one end, a slide mounted for movement along said support including means for moving an article to be cast disposed in said trough shaped portion, a power strand mounted on said elongated support and capable of having energy stored therein, means for connecting said strand to said slide thereby to convert the energy stored in said strand to kinetic energy of said slide upon release of said stored energy, a buffer mechanism mounted on said support comprising a cylinder disposed at a position remote from said one end, a piston in said cylinder, a piston rod connected to said piston and extending along said support in generally parallel relationship therewith, stop means attached to said slide having an opening therein for receiving said piston rod, means for releasably holding said slide in a position to maintain said power strand in a charged condition, a first interference member attached to said rod and engageable by said stop means to move said piston in a direction effective to cushion said slide to a stop, and a second interference member attached to said rod engageable by said stop means to move said piston in the opposite direction in response to stressing said power strand to store energy therein.

5. Apparatus for casting articles comprising an elongated support having a trough shaped portion at one end, a slide supported for movement along said support including means for moving an article to be cast disposed in said trough shaped portion, a power strand mounted on said elongated support and of surgical tubing capable of having energy stored therein, means for connecting said strand to said slide thereby to convert the energy stored in said strand to kinetic energy of said slide upon release of said stored energy, a buffer mechanism mounted on said support comprising a cylinder disposed at a position remote from said one end, a piston in said cylinder, a piston rod connected to said piston and extending along said support in generally parallel relationship therewith, stop means attached to said slide having an opening therein for receiving said piston rod, means for releasably holding said slide in a position to maintain said power strand in a charged condition, and an interference member threaded to said rod and engageable by said stop means upon a predetermined movement of said slide following release of the energy stored in said power strand to cushion said slide to a stop.

6. Apparatus for casting articles comprising an elongated support, a slide dovetailed with said support for movement therealong including means for moving an article to be cast disposed on said support, a power strand mounted on said elongated support and capable of having energy stored therein, means for connecting said strand to said slide thereby to convert the energy stored in said strand to kinetic energy of said slide upon release of said stored energy, a pneumatic cushioning mechanism mounted on said support comprising a cylinder disposed at a position remote from said power strand and a piston reciprocally mounted in said cylinder, a piston rod having one end thereof connected to said piston and extending along said support in generally parallel relationship therewith, means for supporting the other end of said piston rod from said support, stop means attached to said slide having an opening therein for receiving said piston rod, means for releasably holding said slide in a position to maintain said power strand in a charged condition, latching means for engaging said stop means to maintain energy stored in said strand, a buffer member attached to said rod and engageable by said stop means in response to movement of said slide under the influence of said strand to move said piston in a direction effective to cushion said slide to a stop, and a return collar attached to said rod and engageable by said stop means in its movement when storing energy in said strand and prior to engagement of said stop by said latching means.

JESSE FISHER.

References Cited in the file of this patent

UNITED STATES PATENTS

| Number | Name | Date |
|---|---|---|
| 137,080 | James | Mar. 25, 1873 |
| 159,003 | Wiedemann et al. | Jan. 19, 1875 |
| 326,366 | Wilcox | Sept. 15, 1885 |
| 498,070 | Monaghan | May 23, 1893 |
| 1,434,768 | Boggess | Nov. 7, 1922 |
| 1,473,507 | Obermaier | Nov. 6, 1923 |
| 1,827,023 | Keseleff | Oct. 13, 1931 |
| 2,099,957 | Graham | Nov. 23, 1937 |

FOREIGN PATENTS

| Number | Country | Date |
|---|---|---|
| 12,046 | Great Britain | A. D. 1890 |